Dec. 22, 1942.                    W. C. MELCHOR                    2,305,978
                                  FINDER FOR CAMERAS
                                  Filed July 8, 1941              2 Sheets-Sheet 2
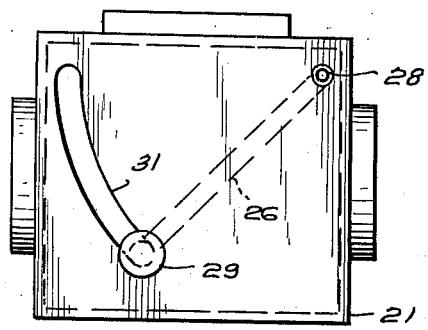
Fig. 5.
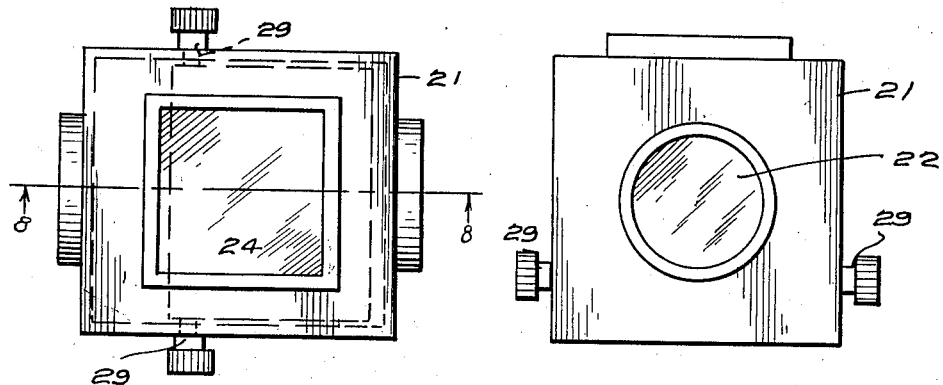
Fig. 6.                                             Fig. 7.
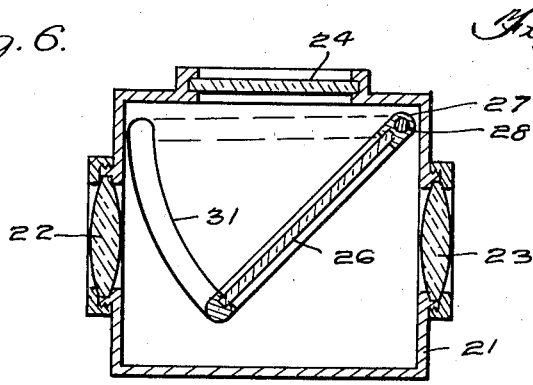
Fig. 8.
Inventor
WARREN C. MELCHOR,
By Clarence A. O'Brien
Attorney Patented Dec. 22, 1942

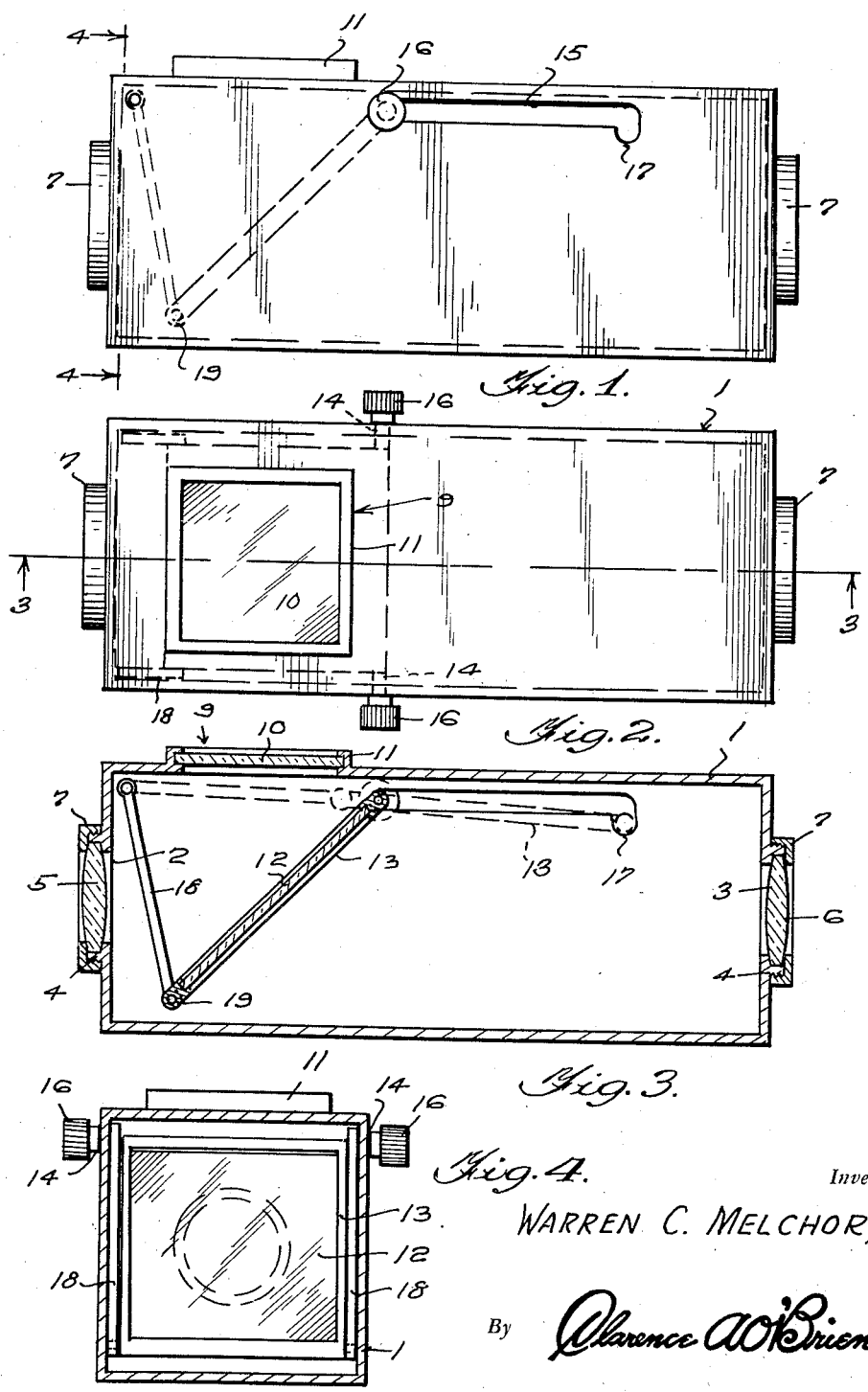

2,305,978

UNITED STATES PATENT OFFICE 2,305,978

FINDER FOR CAMERAS

Warren C. Melchor, Fayetteville, N. C.

Application July 8, 1941, Serial No. 401,489

1 Claim. (Cl. 88—1.5)

My invention relates to improvements in finders for cameras, the principal object in view being to provide a simply constructed, inexpensive device of this character for attachment to any camera and whereby the camera may be focused at levels below the eye by looking downwardly into the finder, or, focused at a level with the eye by looking through the finder.

Other and subordinate objects are also comprehended by my invention, all of which, together with the precise nature of my improvement, wil be readily understood when the succeeding description and claims are read with reference to the drawings accompanying and forming part of this specification.

In said drawings:

Figure 1 is a view in side elevation of the preferred form of my invention,

Figure 2 is a view in top plan,

Figure 3 is a view in longitudinal section taken on the line 3—3 of Figure 2,

Figure 4 is a view in transverse section taken on the line 4—4 of Figure 1,

Figure 5 is a view in side elevation of a modified form of the invention,

Figure 6 is a view in top plan of the modified form,

Figure 7 is a view in front elevation of the modified form, and

Figure 8 is a view in longitudinal section taken on the line 8—8 of Figure 6.

Referring to the drawings by numerals, and first to Figures 1 to 4, my improved finder in its preferred form comprises an elongated, rectangular, box-like casing 1 provided with a pair of front and rear central sight openings 2, 3 in what constitutes the front and rear ends thereof and which ends are provided with outstanding flanges 4 surrounding the openings 2, 3, said flanges accommodating therein a pair of front and rear lenses 5, 6 clamped therein by suitable keeper rings 7 threaded onto the flanges. The casing 1 is provided in the top thereof, adjacent its front end, with a window 9 comprising a square of glass 10 set in an internally rabbeted, upstanding flange 11 provided on said top.

A square, image-reflecting glass 12, fitted in a suitable frame 13, is pivotally and slidably mounted in the casing 1 for adjustment on the one hand, into substantially forty-five degree angular relation to the front lens 5 and the window 10, so that the light entering the casing through the front lens 5 will be reflected by said reflecting glass 12 upwardly to the window 9 and the finder thus conditioned for use by looking down into the window 10 at levels below the eyes. On the other hand said reflecting glass is mounted so as to be adjusted upwardly and rearwardly into an out-of-the-way position in the upper part of the casing 1, to the rear of the window 10 and above the lenses 5, 6 so that the finder may be used by looking through the rear lens 6 toward the front lens 5 at the level of the eye.

The mounting for the reflecting glass 12 comprises a pair of studs 14 extending laterally from side edges of the frame 13, respectively, adjacent upper corners of said frame and rotatably and slidably mounted in a pair of upper longitudinal slots 15 provided in the sides of the casing 1, respectively, said studs having enlarged knurled handgrips 16 at opposite sides of the casing 1 for manipulating said reflecting glass 12. The slots 15 terminate in rear end bottom notches 17 in which the studs 14 seat to latch the reflecting glass 12 in said out-of-the-way position.

Means are provided for swinging the reflecting glass 12 upwardly under sliding of the studs 14 rearwardly in the slots 15 and comprising a pair of links 18 in the casing 1 pivoted, as at 19, at ends thereof to opposite sides of the frame 13, respectively, adjacent lower corners thereof and having their opposite ends pivoted, as at 20, to the sides of the casing 1 adjacent the upper front corners thereof.

As will now be clear, by moving the studs 14 forwardly in the slots 15 to the front ends of the latter, the reflecting glass 12 will be adjusted to the described angular relation by the links 20, and by sliding said studs 14 rearwardly in said slots 15 into the notches 17, said reflecting glass will be swung by said links 18 into the described out-of-the-way position and latched in such position.

In the modified form of the invention shown in Figures 5 to 8, a square casing 21 is provided for the finder with front and rear end lenses 22, 23 and a top window 24 therein all as in the preferred form of the invention. An image-reflecting glass 26 is pivoted, as at 27, in the side walls of the casing 21 by means of pintles 28, the latter being arranged in the rear of the window 24 so that said reflecting glass may be swung into the same angular relation to the front lens 22 and the window 24 as previously described, or, swung upwardly and forwardly beneath the window 24 and above the lenses 22, 23 into an out-of-the-way position. A pair of studs 29, similar to studs 14, are provided on the sides of the glass 26 to extend laterally through a pair of arcuate slots 31 in the sides of the casing 21, respectively, said studs coacting with the ends of the slots 31 to establish the different positions of said glass 26. The studs 29 are adapted to be turned against the outer sides of the casing 21 to latch the glass in its different positions.

The described modified form of the invention is used in the same manner as the preferred form.

The foregoing will, it is believed, suffice to impart a clear understanding of my invention without further explanation.

Manifestly the invention is susceptible of modification in other respects than as herein set forth, and right is reserved to such other modifications falling fairly within the scope of the appended claim.

What I claim is:

In a finder for cameras, a rectangular closed casing including end walls and a top, a pair of sighting lenses in opposite end walls, respectively, for sighting through the casing, a sight glass in said top for sighting downwardly into the casing, an image reflecting glass in said casing, and means to mount said image reflecting glass for adjustment into angular relation to said sight glass and to one of said lenses and also into and out of the way position at the top of the casing, said means comprising a pair of guide slots in opposite sides of the casing, respectively, extending parallel and adjacent to the top of the casing, a pair of manipulative studs extending from opposite side edges of said reflecting glass through said slots and suspending said reflecting glass therefrom, and a pair of links pivoted at ends thereof to said opposite sides of said reflecting glass at points remote from said studs and having their other ends pivoted to the sides of the casing, respectively, adjacent the top of the latter.

WARREN C. MELCHOR.